US012617307B2

(12) United States Patent
Cho

(10) Patent No.: US 12,617,307 B2
(45) Date of Patent: May 5, 2026

(54) VEHICLE CHARGING CONTROL DEVICE AND METHOD THEREFOR

(71) Applicants: HYUNDAI MOTOR COMPANY, Seoul (KR); KIA CORPORATION, Seoul (KR)

(72) Inventor: Yong Woon Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 280 days.

(21) Appl. No.: 17/981,009

(22) Filed: Nov. 4, 2022

(65) Prior Publication Data

US 2023/0311691 A1 Oct. 5, 2023

(30) Foreign Application Priority Data

Apr. 5, 2022 (KR) ........................ 10-2022-0042188

(51) Int. Cl.
| | |
|---|---|
| *B60L 53/62* | (2019.01) |
| *B60L 53/36* | (2019.01) |
| *B60L 53/66* | (2019.01) |
| *B60W 30/06* | (2006.01) |
| *G06Q 20/32* | (2012.01) |

(Continued)

(52) U.S. Cl.
CPC .............. *B60L 53/62* (2019.02); *B60L 53/36* (2019.02); *B60L 53/665* (2019.02); *B60W 30/06* (2013.01); *G06Q 20/322* (2013.01); *G06Q 50/06* (2013.01); *H02J 50/10* (2016.02)

(58) Field of Classification Search
CPC ........ B60L 53/62; B60L 53/36; B60L 53/665; B60L 3/0046; G06Q 50/06; B60W 2556/45
See application file for complete search history.

(56) References Cited

U.S. PATENT DOCUMENTS

| | | | | |
|---|---|---|---|---|
| 8,890,475 | B1 * | 11/2014 | Becker ..................... | B60L 53/66 320/109 |
| 2016/0090054 | A1 * | 3/2016 | Powell ............... | B60H 1/00428 307/9.1 |

(Continued)

FOREIGN PATENT DOCUMENTS

| | | | | | |
|---|---|---|---|---|---|
| CN | 102741083 | B | * | 3/2016 | .............. B60L 53/12 |
| CN | 114228703 | A | * | 3/2022 | |
| KR | 20190015860 | A | | 2/2019 | |

*Primary Examiner* — Toya Pettiegrew
(74) *Attorney, Agent, or Firm* — Lempia Summerfield Katz LLC

(57) ABSTRACT

Disclosed are a vehicle charging control device and a method thereof. The vehicle charging control device includes at least one communication module and at least one processor electrically connected to the at least one communication module. The at least one processor may obtain charging information of a vehicle from a battery management system (BMS) provided in the vehicle through the at least one communication module, determine a charging state of the vehicle based on comparing the charging information of the vehicle with reference data, and transmit, through the at least one communication module, a vehicle control command for correcting a location of the vehicle to an autonomous parking management controller when it is determined that the charging state of the vehicle is abnormal.

20 Claims, 7 Drawing Sheets

CHARGER CONTACT
CHARGING SPACE
MOVEMENT AFTER CHARGING
EMPTY PARKING SPACE
ENTERING CHARGING STATION
EXIT
(a)

410
INTERNET NETWORK (CLOUD)
420
WIRELESS CHARGING PROGRESS
430
BILLING NOTIFICATION, PARKING LOCATION NOTIFICATION
(b)

(51) Int. Cl.
    _G06Q 50/06_        (2024.01)
    _H02J 50/10_        (2016.01)

(56)                References Cited

U.S. PATENT DOCUMENTS

2020/0369173 A1*  11/2020  Kim ...................... B60L 53/665
2021/0129705 A1*   5/2021  Head ................. H01M 10/4257
2022/0281343 A1*   9/2022  Yang ........................ B60L 53/12
2023/0019846 A1*   1/2023  Ehara ..................... B60L 58/12
2023/0092176 A1*   3/2023  Ricketts ................. H02J 7/342
                                                            320/109

* cited by examiner

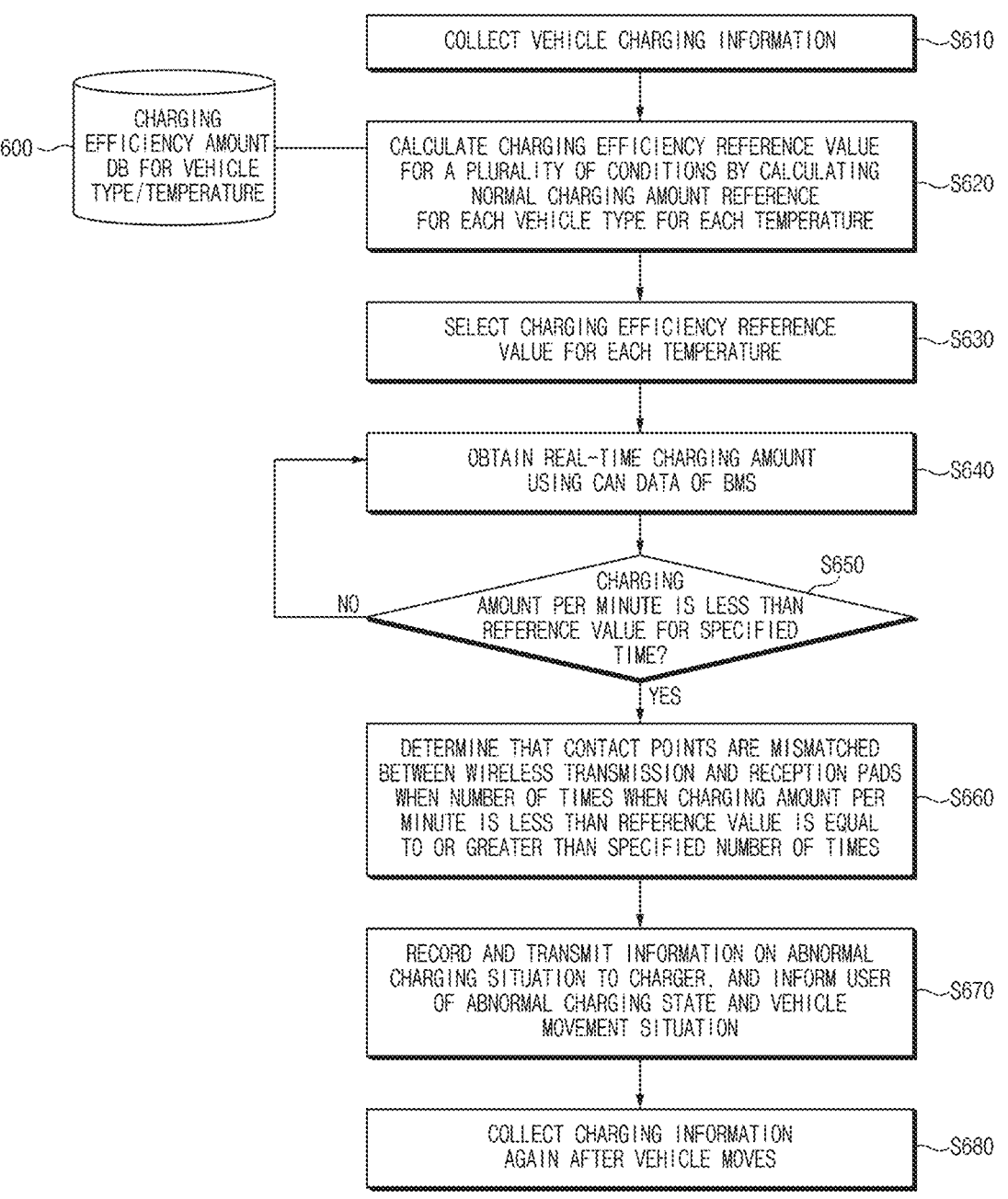

600 — CHARGING EFFICIENCY AMOUNT DB FOR VEHICLE TYPE/TEMPERATURE

COLLECT VEHICLE CHARGING INFORMATION ~S610

CALCULATE CHARGING EFFICIENCY REFERENCE VALUE FOR A PLURALITY OF CONDITIONS BY CALCULATING NORMAL CHARGING AMOUNT REFERENCE FOR EACH VEHICLE TYPE FOR EACH TEMPERATURE ~S620

SELECT CHARGING EFFICIENCY REFERENCE VALUE FOR EACH TEMPERATURE ~S630

OBTAIN REAL-TIME CHARGING AMOUNT USING CAN DATA OF BMS ~S640

CHARGING AMOUNT PER MINUTE IS LESS THAN REFERENCE VALUE FOR SPECIFIED TIME? S650 — NO — YES

DETERMINE THAT CONTACT POINTS ARE MISMATCHED BETWEEN WIRELESS TRANSMISSION AND RECEPTION PADS WHEN NUMBER OF TIMES WHEN CHARGING AMOUNT PER MINUTE IS LESS THAN REFERENCE VALUE IS EQUAL TO OR GREATER THAN SPECIFIED NUMBER OF TIMES ~S660

RECORD AND TRANSMIT INFORMATION ON ABNORMAL CHARGING SITUATION TO CHARGER, AND INFORM USER OF ABNORMAL CHARGING STATE AND VEHICLE MOVEMENT SITUATION ~S670

COLLECT CHARGING INFORMATION AGAIN AFTER VEHICLE MOVES ~S680

FIG.6

VEHICLE CHARGING CONTROL DEVICE AND METHOD THEREFOR

CROSS-REFERENCE TO RELATED APPLICATION

This application claims the benefit of priority to Korean Patent Application No. 10-2022-0042188, filed in the Korean Intellectual Property Office on Apr. 5, 2022, the entire contents of which are incorporated herein by reference.

TECHNICAL FIELD

The present disclosure relates to a vehicle charging control device and a method thereof, and more particularly, to a technology for controlling a charging location of a vehicle by using an autonomous parking function.

BACKGROUND

In the future electrification era, a simpler and faster charging scheme is required for an electric vehicle charging scheme, and to this end, a wireless charging scheme or an autonomous charging scheme technology should be based in addition to a fast-charging scheme. For wireless charging of a vehicle, it is necessary to propose a scheme of contacting a wireless power transmission pad and a wireless power reception pad of a vehicle at an accurate location. In addition, it is necessary to automate the charging process to provide various conveniences to a driver during charging which takes a long time.

As a parking convenience function, a remote smart parking assist function is applied to autonomous vehicles that can help parking and exiting remotely from the outside of the vehicle by using an omnidirectional camera and an ultrasonic sensor. By utilizing such a remote smart parking assist function, it is possible to recognize parking lines and surrounding objects. In addition, by automatically controlling steering, vehicle speed, and gear shifting, it is possible to provide remote parking and un-parking services even when a driver is not in the vehicle.

In addition, a wireless charging function may be provided by contacting a wireless transmission/reception pad between an electric vehicle and a charger, but the electric vehicle may not be charged due to a defective contact between the wireless transmission/reception pads. In addition, it is necessary to consider what kind of convenience is provided to the driver during the charging time of an electric vehicle, which is longer than the refueling time of an existing internal combustion engine vehicle.

SUMMARY

The present disclosure has been made to solve the above-mentioned problems occurring in the prior art while advantages achieved by the prior art are maintained intact.

One aspect of the present disclosure provides a vehicle charging control device and a method thereof capable of recognizing an accurate position between a charging pad and a vehicle by utilizing an autonomous parking function mounted in the vehicle.

Another aspect of the present disclosure provides a vehicle charging control device and a method thereof capable of providing feedback between a charger and a vehicle for wireless charging efficiency by utilizing an autonomous parking function mounted in the vehicle.

Another aspect of the present disclosure provides a vehicle charging control apparatus and a method thereof capable of providing charging and payment functions based on vehicle communication.

Another aspect of the present disclosure provides a vehicle charging control device and a method thereof capable of monitoring a controller area network (CAN) communication signal to provide a scheme for correcting a position between a charger and a vehicle.

The technical problems solved by the present disclosure are not limited to the aforementioned problems, and any other technical problems not mentioned herein should be clearly understood from the following description by those ordinarily skilled in the art to which the present disclosure pertains.

According to an aspect of the present disclosure, a vehicle charging control device includes at least one communication module, and at least one processor electrically connected to the at least one communication module. The at least one processor may obtain charging information of a vehicle from a battery management system (BMS) provided in the vehicle through the at least one communication module, determine a charging state of the vehicle based on comparing the charging information of the vehicle with reference data, and transmit, through the at least one communication module, a vehicle control command for correcting a location of the vehicle to an autonomous parking management controller when it is determined that the charging state of the vehicle is abnormal.

According to an embodiment, the control command of the vehicle may include a control command corresponding to at least one of a forward control, a reverse control, a steering control, or a stop control.

According to an embodiment, the at least one processor may receive a signal, such as a controller area network (CAN) signal, from the BMS in real time through the at least one communication module and obtain the charging information of the vehicle based on the received signal.

According to an embodiment, the charging information may include at least one of a charging speed, a charging amount, or a charging efficiency of the vehicle. The reference data may include a reference charging efficiency determined based on at least one of a vehicle type, a battery capacity for each vehicle type, a vehicle charging scheme, a BMS charging setting parameter, temperature information, or weather information.

According to an embodiment, the at least one processor may determine that the charging state is abnormal when, as a comparison result, a charging amount of the vehicle for a specified time is less than a reference value.

According to an embodiment, the at least one processor may transmit charging state information to a user terminal or an audio, video, navigation (AVN) device provided in the vehicle through the at least one communication module when a number of times that it is determined that the charging state of the vehicle is abnormal is greater than or equal to a specified number of times.

According to an embodiment, the vehicle charging control device may further include a memory, wherein the processor may store information on an abnormal charging state in the memory when the number of times that it is determined that the charging state of the vehicle is abnormal is greater than or equal to a specified number of times. The processor may also transmit, through the at least one communication module, a charge pause request command to a charger.

According to an embodiment, the processor may transmit, through the at least one communication module, data for confirming whether to replace a charger to a user terminal or an AVN device provided in the vehicle when it is determined that the charging state of the vehicle is abnormal after the location of the vehicle is corrected in response to the control command of the vehicle.

According to an embodiment, the processor may transmit, through the at least one communication module, a control command for moving the vehicle to another charging parking space to the autonomous parking management controller in response to a charger replacement approval input through the user terminal or the AVN device provided in the vehicle.

According to an embodiment, the processor may transmit, through the at least one communication module, information on payment of a charging fee and information on exiting of the vehicle to a user mobile phone or a user key when charging of the vehicle is completed after the location of the vehicle is corrected in response to the control command of the vehicle.

According to an aspect of the present disclosure, a method of controlling charging of a vehicle includes obtaining, by at least one processor, charging information of a vehicle from a battery management system (BMS) provided in the vehicle through the at least one communication module. The method of controlling charging of a vehicle also includes determining, by the at least one processor, a charging state of the vehicle based on comparing the charging information of the vehicle with reference data, and transmitting, by the at least one processor, a vehicle control command for correcting a location of the vehicle to an autonomous parking management controller through the at least one communication module when it is determined that the charging state of the vehicle is abnormal.

According to an embodiment, the control command of the vehicle may include a control command corresponding to at least one of a forward control, a reverse control, a steering control, or a stop control.

According to an embodiment, the obtaining of the charging information of the vehicle may include receiving, by the at least one processor, a signal, such as a controller area network (CAN) signal, from the BMS in real time through the at least one communication module, and obtaining, by the at least one processor, the charging information of the vehicle based on the received signal.

According to an embodiment, the charging information may include at least one of a charging speed, a charging amount, or a charging efficiency of the vehicle. The reference data may include a reference charging efficiency determined based on at least one of a vehicle type, a battery capacity for each vehicle type, a vehicle charging scheme, a BMS charging setting parameter, temperature information, or weather information.

According to an embodiment, the method may further include determining, by the at least one processor, that the charging state is abnormal when, as a comparison result, a charging amount of the vehicle for a specified time is less than a reference value.

According to an embodiment, the method may further include transmitting, by the at least one processor, charging state information to a user terminal or an AVN device provided in the vehicle through the at least one communication module when a number of times that it is determined that the charging state of the vehicle is abnormal is greater than or equal to a specified number of times.

According to an embodiment, the method may further include storing, by the at least one processor, information on an abnormal charging state in the memory when the number of times that it is determined that the charging state of the vehicle is abnormal is greater than or equal to a specified number of times. The method may further include transmitting, by the at least one processor, a charge pause request command to a charger through the at least one communication module.

According to an embodiment, the method may further include transmitting, by the at least one processor, data for confirming whether to replace a charger to a user terminal or an AVN device provided in the vehicle through the at least one communication module when it is determined that the charging state of the vehicle is abnormal after the location of the vehicle is corrected in response to the control command of the vehicle.

According to an embodiment, the method may further include transmitting, by the at least one processor, a control command for moving the vehicle to another charging parking space to the autonomous parking management controller through the at least one communication module in response to a charger replacement approval input through the user terminal or the AVN device provided in the vehicle.

According to an embodiment, the method may further include transmitting, by the at least one processor, information on payment of a charging fee and information on exiting of the vehicle to a user mobile phone or a user key through the at least one communication module when charging of the vehicle is completed after the location of the vehicle is corrected in response to the control command of the vehicle.

BRIEF DESCRIPTION OF THE DRAWINGS

The above and other objects, features, and advantages of the present disclosure should be more apparent from the following detailed description taken in conjunction with the accompanying drawings:

FIG. 6 is a flowchart illustrating correcting a location of a vehicle in a vehicle charging control device and a method thereof according to an embodiment of the present disclosure.

DETAILED DESCRIPTION

Figure 1:
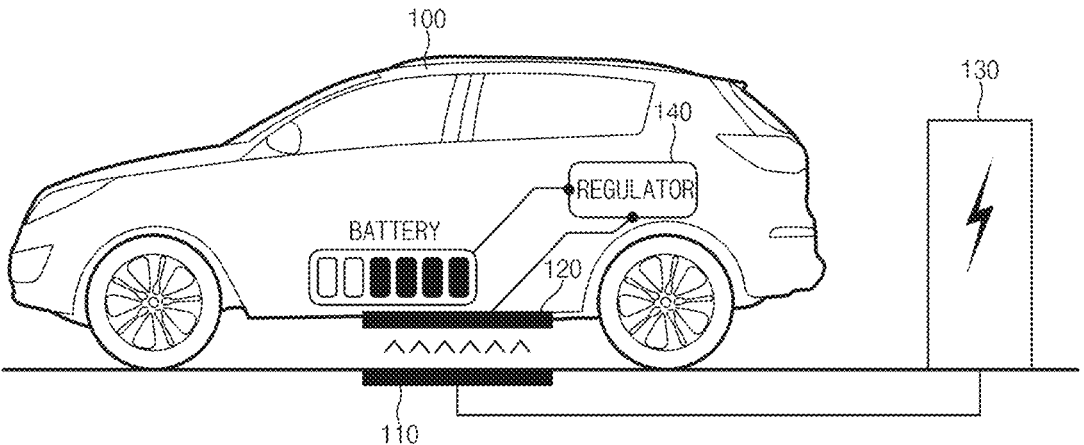
FIG. 1 is a diagram illustrating that a vehicle is wirelessly charged by a vehicle charging control device and a method thereof according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing an embodiment of the present disclosure, a detailed description of the related known configuration or function is omitted when it is determined that it interferes with the understanding of the embodiment of the present disclosure being described.

In describing the components of an embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly defined herein.

Hereinafter, with reference to FIGS. 1-7, embodiments of the present disclosure are described in detail.

FIG. 1 is a diagram illustrating that a vehicle is wirelessly charged by a vehicle charging control device and a method thereof according to an embodiment of the present disclosure.

Referring to FIG. 1, in a vehicle charging control device and a method thereof according to an embodiment of the present disclosure, the wireless charging of a vehicle may be performed by using at least one of a vehicle 100, a transmission pad 110, a reception pad 120, a controller 140, or a wireless charger 130.

According to an embodiment, the vehicle 100 may include the reception pad 120 and the controller 140.

According to various embodiments, the vehicle 100 may include a plug-in hybrid electric vehicle (PHEV) as well as a pure electric vehicle (EV) that moves by driving a motor with the power of a battery.

Hereinafter, the description of a car or vehicle in the description refers to an electric vehicle unless otherwise specified. However, the present disclosure is not limited thereto and may include various types of charging vehicles.

According to an embodiment, the reception pad 120 is arranged at a location parallel to the transmission pad 110 of the wireless charger 130 to receive power transmitted wirelessly.

According to an embodiment, the reception pad 120, which is a vehicle assembly (VA) for supporting a wireless charging function, may include a reception coil for receiving wirelessly transmitted power, a resonance circuit for frequency matching, a filter, and a rectifier.

According to an embodiment, the controller 140, which is an integrated power controller for controlling the charging and discharging of the vehicle 100, may supply the power received through the reception pad 120 to the vehicle 100 to control the charging and discharging.

According to an embodiment, the controller 140 may include a low-voltage direct current converter (LDC) for converting a high voltage into a commercial voltage of an electric load in the vehicle, a motor controller or motor control unit (MCU), a vehicle controller or vehicle control unit (VCU), an on-board charger (OBC), and the like.

According to an embodiment, the wireless charger 130 is a device that receives power from a commercial AC power network and transmits the power to the vehicle 100 in a wireless power transfer (WPT) scheme to charge the vehicle 100.

According to an embodiment, the wireless charger 130 may wirelessly transmit power through the transmission pad 110 located on an inspection reference line of a floor to wirelessly charge the vehicle 100, and to this end, may include a PFC converter for rectifying commercial power, a DC-AC inverter, a filter, and a resonance circuit.

According to an embodiment, at least one transmission pad 110 may be arranged to transmit electricity to the reception pad 120 through a free space medium by using a magnetic resonance phenomenon.

Figure 2:
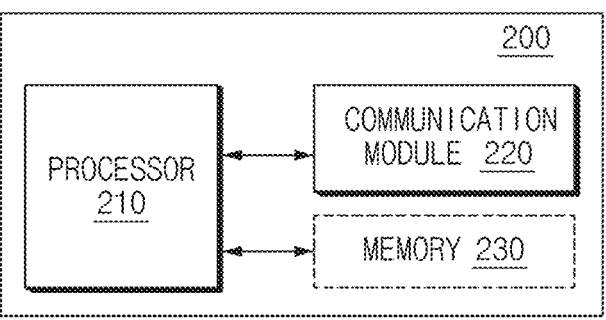
FIG. 2 is a block diagram illustrating a vehicle charging control device according to an embodiment of the present disclosure.

FIG. 2 is a block diagram illustrating a vehicle charging control device according to an embodiment of the present disclosure.

Referring to FIG. 2, a vehicle charging control device 200 according to an embodiment may include a processor 210, a communication module 220 and a memory 230.

In various embodiments, the vehicle charging control device 200 may include additional components in addition to the components illustrated in FIG. 2 or may omit at least one of the components illustrated in FIG. 2.

According to an embodiment, the processor 210 may be electrically connected to the communication module 220 and the memory 230, may electrically control each component, and may be an electric circuit executing a command of software, thereby performing various data processing and calculations described below.

According to an embodiment, the processor 210 may be a central processing unit that controls the overall operation of the respective parts and peripheral equipment (device/ system) for the wireless charging test of the vehicle according to the embodiment of the present disclosure. According to an embodiment, the configuration of each part and peripheral equipment may be configured in a form in which hardware, software, or hardware and software are combined, and their respective functions and roles are substantially operated or interlocked under the control of the processor 210.

According to an embodiment, the processor 210 may execute an operation or data processing related to control and/or communication of at least one other component of the vehicle charging control device 200. Specific details related to the operation of the processor 210 are described below with reference to FIGS. 3 and 6.

According to an embodiment, the communication module 220 may receive a communication signal from the controllers provided in the vehicle. According to an embodiment, the communication module 220 may transmit a communication signal to controllers provided in the vehicle.

For example, when the communication module 220 receives or transmits a communication signal from or to the controllers provided in the vehicle, at least one of a controller area network (CAN), a local interconnect network (LIN), or Ethernet is available.

For example, the communication module 220 may use at least one of CAN, LIN, or Ethernet to transmit or receive a communication signal to or from at least one of a battery management system (BMS) controller, an autonomous parking controller, or an audio, video, navigation (AVN) controller.

According to an embodiment, the communication module 220 may include at least one of a mobile communication module, a wireless Internet module, and a short-range communication module for communicating with the user terminal.

According to an embodiment, the mobile communication module may support communication through a mobile communication network constructed according to a technical standard or communication scheme for mobile communication (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), 4th generation mobile telecommunication (4G), 5th generation mobile telecommunication (5G), and the like).

According to an embodiment, the wireless Internet module, which is a module for wireless Internet access, may support communication through wireless local area network (WLAN), wireless-fidelity (Wi-Fi), Wi-Fi direct, digital living network alliance (DLNA), wireless broadband (Wi-Bro), world interoperability for microwave access (WiMAX), HSDPA, HSUPA, LTE, LTE-A, and the like.

According to an embodiment, the short-range communication module may support short-range communication by using at least one of Bluetooth™, radio frequency identification (RFID), infrared data association (IrDA), ultra-wideband (UWB), zonal intercommunication global-standard (ZigBee), near field communication (NFC), and wireless universal serial bus (USB) technology.

According to an embodiment, the memory 230 may store data and/or algorithms necessary for the operation of the vehicle charging control device 200.

According to an embodiment, the memory 230 may store information about the charging state of the vehicle.

According to an embodiment, the memory 230 may store information about an abnormal charging situation of the vehicle. For example, when the number of times that it is determined that the charging state of the vehicle is abnormal is greater than or equal to a specified number of times, the memory 230 may store information on the abnormal charging state.

According to an embodiment, the memory 230 may include a storage medium such as a random access memory (RAM), a static random access memory (SRAM), a read-only memory (ROM), a programmable read-only memory (PROM) and/or an electrically erasable programmable read-only memory (EEPROM).

Figure 3:
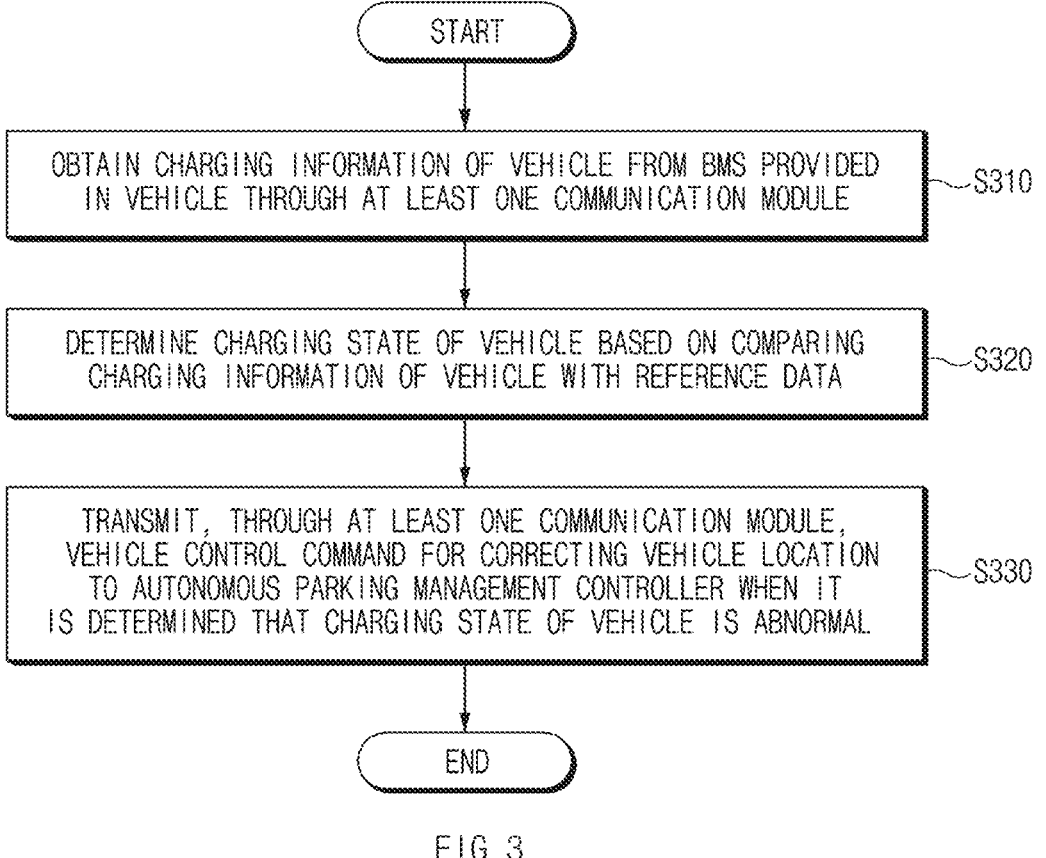
FIG. 3 is a flowchart illustrating a method of controlling charging of a vehicle according to an embodiment of the present disclosure.

FIG. 3 is a flowchart illustrating a method of controlling charging of a vehicle according to an embodiment of the present disclosure.

In the following embodiment, the operations of S310 to S330 may be sequentially performed but are not necessarily performed sequentially. For example, the order of each operation may be changed, and at least two operations may be performed in parallel.

Referring to FIG. 3, according to a vehicle charging control device and a method thereof of embodiments, in S310, a processor may obtain charging information of a vehicle from a BMS provided in a vehicle through at least one communication module.

According to an embodiment, the processor may receive a signal, such as a CAN signal, from the BMS in real time through the at least one communication module and obtain the charging information of the vehicle based on the received signal. In one example, the processor may obtain charging information of the vehicle by monitoring CAN communication of the BMS controller provided in the vehicle.

For example, the charging information of the vehicle may include information on the charging efficiency of the vehicle. The charging efficiency of the vehicle may be determined by the charging speed of the vehicle and the charging amount of the vehicle.

According to an embodiment, in S320, the processor may determine a charging state of the vehicle based on comparing the charging information of the vehicle with reference data.

According to an embodiment, the processor may compare the charging efficiency of the vehicle included in the vehicle charging information obtained through the at least one communication module with reference data.

According to an embodiment, the reference data may include reference charging efficiency. Hereinafter, the reference data in the present disclosure may be referred to as a reference charging efficiency or a reference value of charging efficiency.

According to an embodiment, the reference charging efficiency may be determined differently depending on at least one of a vehicle type and a temperature.

For example, as a charging amount and a charging speed serving as a reference value of charging efficiency vary according to a battery capacity for each vehicle type, a charging scheme of a vehicle, a BMS charging setting parameter, and the like, the reference charging efficiency may be calculated differently.

In addition, for example, because the reference value of the charging efficiency may be affected by climate according to the electrical/chemical characteristics of the battery, the scheme of calculating the reference value of the charging efficiency may vary according to temperature and weather conditions.

According to an embodiment, the processor may utilize the temperature information collected from the vehicle temperature sensor as a CAN message of a cluster.

According to an embodiment, the processor may determine weather information such as rain or snow collected from a rain sensor as a CAN message of a vehicle integrated body control unit (IBU).

According to an embodiment, the processor may check the state of the charging transmission pad photographed by the vehicle omnidirectional camera to comprehensively determine the climatic condition. For example, the state of the transmission pad may include a state in which rain or snow is accumulated on the transmission pad.

According to an embodiment, the processor may determine (or calculate) a reference value of charging efficiency based on comprehensively determining the climatic conditions.

For example, the processor may change the reference value of the charging efficiency whenever the value of the outside temperature sensor in the CAN message of the cluster varies by a specified temperature (e.g., 10 degrees). In addition, for example, the processor may determine the reference value of the charging efficiency based on determining whether it is raining or snowing with a rain sensor value in the CAN message of the IBU. In addition, for example, when it is determined that the state of the charging transmission pad recognized through the omnidirectional camera of the vehicle is an abnormal state (e.g., a snowy state or a frozen state due to rain), the processor may change the reference value of the charging efficiency.

According to an embodiment, the processor may determine the charging state of the vehicle by comparing the determined (or calculated) reference value of the charging efficiency with the charging efficiency of the vehicle obtained from the BMS.

According to an embodiment, when it is determined that the charging efficiency of the vehicle is less than the reference value of the charging efficiency based on a result of comparing the determined (or calculated) charging efficiency reference value and the vehicle charging efficiency obtained from the BMS, the processor may determine that the charging state of the vehicle is abnormal.

For example, when the charging amount of the vehicle for a specified time is less than the reference value, the processor may determine that the charging state of the vehicle is abnormal.

In addition, for example, the processor may determine that the charging state of the vehicle is abnormal when the charging transmission pad is not recognized or when it is determined that it is impossible to charge the vehicle. The case in which it is determined that it is impossible to charge the vehicle may include a case in which it is impossible to charge the vehicle due to weather such as snow.

According to an embodiment, in S330, when it is determined that the charging state of the vehicle is abnormal, the processor may transmit, through the at least one communication module, a vehicle control command for correcting a location of the vehicle to an autonomous parking management controller.

According to an embodiment, when it is determined that the charging state of the vehicle is abnormal, the processor may inform the driver of the charging state of the vehicle. For example, when it is determined that the charging state of the vehicle is abnormal, the processor may transmit the charging state information to the user's terminal device or an audio, video, navigation (AVN) device provided in the vehicle through the communication module.

According to an embodiment, when it is determined that the charging state of the vehicle is abnormal, the processor may suggest movement of the vehicle to the driver. For example, the processor may transmit data on the charging state of the vehicle to the user's terminal or the AVN device provided in the vehicle.

According to an embodiment, when it is determined that the charging state of the vehicle is abnormal, a vehicle control command for correcting the location of the vehicle may be transmitted to the autonomous parking management controller. For example, the vehicle control command may include a control command corresponding to at least one of a forward control, a reverse control, a steering control, or a stop control.

According to an embodiment, when the number of times that it is determined that the charging state of the vehicle is abnormal is greater than or equal to a specified number of times (e.g., three times), the processor may transmit the vehicle control command for correcting the location of the vehicle to the autonomous parking management controller.

According to another embodiment, when it is determined that the charging state of the vehicle is abnormal, the processor may transmit a climatic condition determined by the vehicle and charging transmission pad recognition information to the charger through power line communication (PLC). In this case, the processor may request an additional device in the charging facility to supply heat to the transmission pad or request operation of snow removal equipment.

Figure 4:
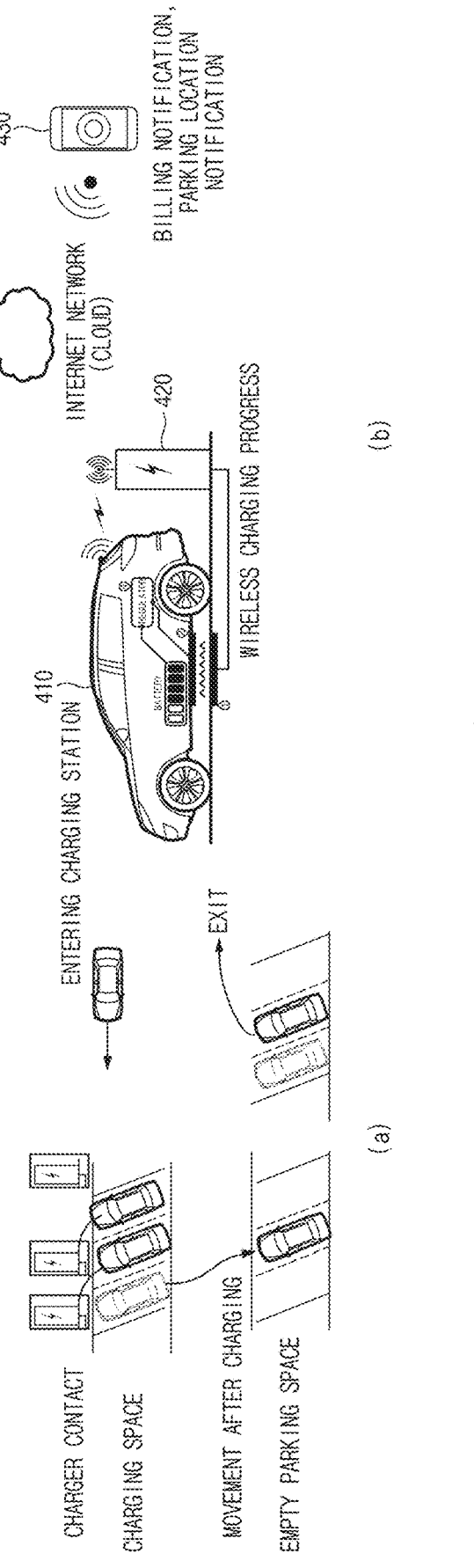
FIG. 4 is a diagram illustrating a process of charging a vehicle in a vehicle charging control device and a method thereof according to an embodiment of the present disclosure.

FIG. 4 is a diagram illustrating a process of charging a vehicle in a vehicle charging control device and a method thereof according to an embodiment of the present disclosure.

Referring to (a) of FIG. 4, a vehicle charging control device according to an embodiment may control the charging of a vehicle entering a charging station based on a desired charging fee set by the driver of the vehicle through a portable terminal or the AVN device.

According to an embodiment, as the desired charging fee is set by the driver of the vehicle entering the charging station through the portable terminal or the AVN device and the driver exits the vehicle, the vehicle charging control device, according to an embodiment, may control the charging of the vehicle.

According to an embodiment, the vehicle charging control device may determine the charging efficiency and may determine whether the charging efficiency of the vehicle is less than a reference value of the charging efficiency.

According to an embodiment, the vehicle charging control device may monitor the CAN communication signal of the BMS controller that is the battery management module of the vehicle to determine the charging efficiency of the vehicle.

According to an embodiment, when it is determined that the charging efficiency of the vehicle is less than the reference value, the vehicle charging control device of the vehicle may determine (or recognize) that the contact point between the reception pad receiving power and the transmission pad transmitting power is mismatched.

According to an embodiment, when it is determined that the contact point between the reception pad and the transmission pad is mismatched, the vehicle charging control device may perform vehicle parking position correction to match the contact point between the reception pad and the transmission pad.

According to an embodiment, the vehicle charging control device may collect the vehicle charging information for a specified period of time after correcting the parking location of the vehicle.

According to an embodiment, when it is determined that the charging efficiency of the vehicle is less than the reference value based on the charging information obtained for the specified period of time after performing the vehicle parking location correction, the vehicle charging control device may determine an equipment failure.

According to an embodiment, when it is determined that the charging equipment is out of order, the vehicle charging control device may confirm to the driver whether to replace the charger. For example, the vehicle charging control device may transmit data for confirming whether to replace the charger to the user terminal or the AVN device provided in the vehicle.

According to an embodiment, the vehicle charging control device may move the vehicle to another charging parking space in response to a charger replacement approval input of the user. For example, the vehicle charging control device may move the vehicle into another charging parking space in response to the charger replacement approval input through the user terminal or the AVN device provided in the vehicle.

According to an embodiment, after the charging of the vehicle is completed, the vehicle charging control device may move the vehicle to an empty parking space through the autonomous parking function, and then transmit the parking location to a user mobile phone, thereby causing the driver to get in the vehicle and exit the parking lot.

Referring to (b) of FIG. 4, in the vehicle charging control device and method thereof, the wireless charging of a vehicle 410 may be performed by receiving power from a wireless charger 420. Because the contents of the vehicle 410 being charged by the wireless charger 420 overlap with the contents described above in FIG. 1, the description of FIG. 4 is omitted.

According to an embodiment, in the vehicle charging control device and method thereof, when the charging of the vehicle 410 is completed, information on payment of a charging fee and information on exiting of the vehicle may be transmitted to a user mobile phone 430 or a user key (not shown) through at least one communication module.

For example, information on payment of the charging fee may include charging information calculated based on the charging time and parking time of the vehicle.

In addition, for example, the exit information may include information on the current parking location of the vehicle.

Figure 5:
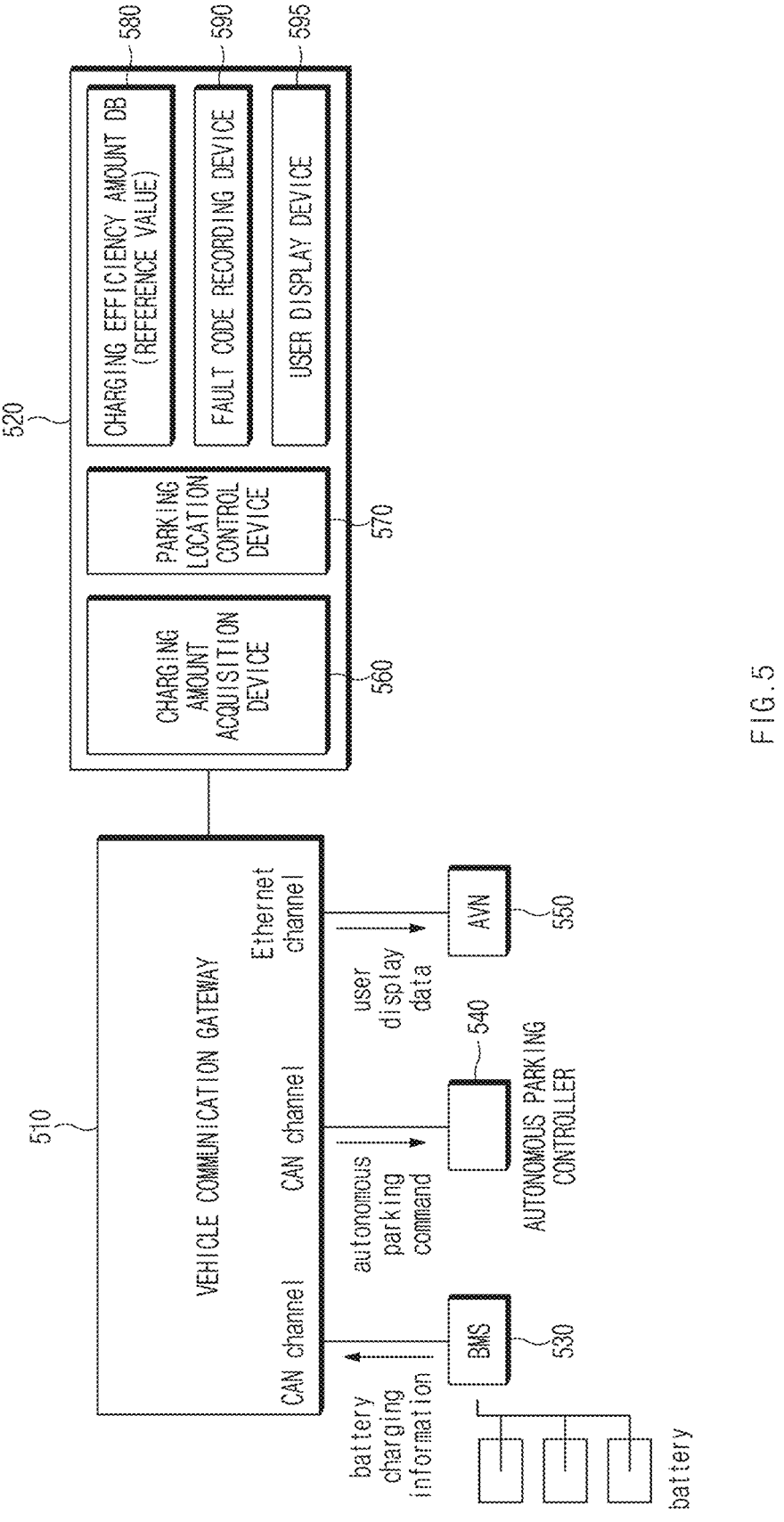
FIG. 5 is a diagram illustrating monitoring a charging amount and controlling a location of a vehicle in the vehicle charging control device and method thereof according to an embodiment of the present disclosure.

FIG. 5 is a diagram illustrating monitoring a charging amount and controlling a location of a vehicle in the vehicle charging control device and method thereof according to an embodiment of the present disclosure.

Referring to FIG. 5, according to an embodiment, in the vehicle charging control device, the charging control may be performed through a vehicle communication gateway 510 and a charging control module 520.

According to an embodiment, at least one processor may be electrically connected to the vehicle communication gateway 510 and the charge amount monitoring and location control module 520 to electrically control each component.

According to various embodiments, in the vehicle charging control device and method thereof, the charging control may be performed by using additional components other than the components shown in FIG. 5 or by omitting at least one of the components shown in FIG. 5.

According to an embodiment, the vehicle communication gateway 510 may be connected to several electronic control units (ECUs) in the vehicle to monitor an operating state or abnormality of the vehicle.

According to an embodiment, the vehicle communication gateway 510 may transmit/receive and monitor at least one communication signal of a controller area network (CAN), a local interconnect network (LIN), or Ethernet of the controllers in the vehicle.

According to an embodiment, the vehicle communication gateway 510 may obtain battery charging information from the BMS controller 530 through a CAN channel.

According to an embodiment, the vehicle communication gateway 510 may transmit an autonomous parking command to an autonomous parking controller 540 through a CAN channel.

According to an embodiment, the vehicle communication gateway 510 may transmit data to an AVN device 550 through an Ethernet channel.

According to an embodiment, the BMS controller 530 may manage charging/discharging information of a vehicle battery. According to an embodiment, the BMS controller 530 may manage the vehicle battery so that it is efficiently charged.

According to an embodiment, the BMS controller 530 may examine the operating state of the BMS system based on information received from the integrated power controller that controls charging or discharging. In this case, the integrated power controller may be composed of a BMS ECU/power relay assembly (PRA) that is a control module in the vehicle and may include a system that manages the battery cell, predicts the state of charge (SOC) of the battery, limits power, diagnoses a diagnostic trouble code (DTC), and controls cooling.

According to an embodiment, the BMS controller 530 may perform a battery SOC test, a battery output test, a power relay test, a cooling test, a malfunction diagnosis test, and the like based on the information received from the integrated power controller during wireless charging, thereby determining whether there is an abnormality in charging.

According to an embodiment, the autonomous parking controller 540 may recognize a parking line, a surrounding object, and the like.

For example, the autonomous parking controller 540 may detect an object or a parking space around the vehicle by using at least one of: an ultrasonic sensor (not shown); a light detection and ranging (LiDAR: not shown); a radio detecting and ranging (radar) sensor (not shown); and a camera (not shown).

According to an embodiment, the autonomous parking controller 540 may detect an object or a parking space around the vehicle to perform at least one of an autonomous parking function and an exit function.

According to an embodiment, the AVN device 550, which is a vehicle multimedia system in which an audio system, a video system, and a navigation system are integrated into one unit form, may receive a target charging amount of the vehicle.

According to an embodiment, the AVN device 550 may display the charging state of the vehicle or output (or provide) data on the autonomous parking operation.

In the vehicle charging control device and method thereof according to an embodiment, the charging control module 520 may include a function module capable of monitoring a charging amount of the vehicle and controlling a vehicle location correction command.

In the vehicle charging control device and method thereof according to an embodiment, the charging control module 520 may be configured in addition to the vehicle communication gateway 510.

According to an embodiment, the charging control module 520 may include a charging amount acquisition device 560, a parking location control device 570, a charging efficiency amount database 580, a fault code recording device 590, and a user display device 595. Hereinafter, in the present disclosure, the charging efficiency amount database 580 may be referred to as a reference value 580.

In various embodiments, the charging control module 520 may include additional components in addition to the components shown in FIG. 5 or may omit at least one of the components shown in FIG. 5.

According to an embodiment, the charging amount acquisition device 560 may acquire (or measure) a signal collected through a CAN channel for battery charging information in real time and transmit it to the parking location control device 570.

According to an embodiment, the parking location control device 570 may determine the charging state of the vehicle based on comparing the charging amount information obtained for a specified period of time in real time with the reference value 580.

For example, the parking location control device 570 may measure (or acquire) the charging amount in units of 1 minute for the first 5 minutes from the time of obtaining the charging amount information and compare the charging amount with the reference value 580.

According to an embodiment, the parking location control device 570 may determine that the contact points are not matched between the wireless transmission and reception pads at the current location of the vehicle when it is determined that the charging amount of the vehicle is abnormal, as the result of comparing the vehicle charging amount and the reference value 580. For example, when the charging amount of the vehicle is less than the reference value 580, the parking location control device 570 may determine that the charging amount of the vehicle is abnormal.

According to an embodiment, the parking location control device 570 may generate a parking location correction command when it is determined that the contact points do not match between the wireless transmission and reception pads at the current location of the vehicle.

According to an embodiment, after the vehicle is moved (or after the vehicle location is corrected), the parking location control device 570 may collect the charging information of the vehicle again and may perform the replacement of the charger and the movement of the vehicle when the abnormal situation is repeated.

According to an embodiment, the charging efficiency amount database 580 may include a charging amount reference value calculated with a normal charging amount standard for each vehicle type according to a temperature (e.g., room temperature or low temperature) condition.

According to an embodiment, the fault code recording device 590 may record information about the abnormal charging situation based on an in-vehicle fault code.

According to an embodiment, the user display device 595 may inform the user of an abnormal charging situation through a display included in the AVN device.

According to an embodiment, the charging control module 520 may transmit a charging pause request command to the charger as the vehicle location is corrected.

According to the above-described embodiments, the vehicle charging control device according to the present disclosure may collect CAN messages and camera image information by using the vehicle communication gateway, so that it is possible to control the vehicle charging only by adding the logic for the charging control module without additional equipment.

FIG. 6 is a flowchart illustrating correcting a location of a vehicle in a vehicle charging control device and a method thereof according to an embodiment of the present disclosure.

In the following embodiment, the operations of S610 to S680 may be sequentially performed but are not necessarily performed sequentially. For example, the order of each operation may be changed, and at least two operations may be performed in parallel.

With respect to the description of FIG. 6, contents that overlap with or correspond to the foregoing are briefly described or omitted.

Referring to FIG. 6, in a vehicle charging control device and a method thereof according to an embodiment, in S610, the processor may collect vehicle charging information.

According to an embodiment, the processor may collect vehicle charging information including at least one of a type of vehicle being charged, a vehicle battery capacity, a vehicle charging scheme, a BMS charging setting parameter, a vehicle charging amount, or a vehicle charging time.

According to an embodiment, in S620, the processor may calculate a charging efficiency reference value for a plurality of conditions by calculating a normal charging amount reference for each vehicle type for each temperature.

According to an embodiment, the processor may calculate a charging efficiency reference value based on the charging efficiency amount database 600.

According to an embodiment, the charging efficiency amount database 600 may include a database that is obtained with a charging amount monitoring reference value by calculating a normal charging amount reference for each vehicle type according to a temperature condition. For example, the temperature condition may include at least one of a room temperature condition and a low temperature condition.

According to an embodiment, the processor may select a charging efficiency reference value for each temperature for each type of vehicle.

For example, the processor may determine the charging efficiency reference value as the first reference value when the vehicle type is a first type and the vehicle is at room temperature. In addition, for example, the processor may determine the charging efficiency reference value as the second reference value when the vehicle type is the first type and the vehicle is at a low temperature.

For example, the processor may determine the charging efficiency reference value as the third reference value when the vehicle type is the second type and the vehicle is at room temperature. In addition, for example, the processor may determine the charging efficiency reference value as the fourth reference value when the vehicle type is the second type and the vehicle is at a low temperature.

According to an embodiment, in S630, the processor may select (or determine) a charging efficiency reference value for each temperature.

For example, when the temperature is room temperature, the processor may select a charging efficiency reference value calculated based on the room temperature. In addition, for example, when the temperature is low, the charging efficiency reference value calculated based on the low temperature may be selected.

According to an embodiment, in S640, the processor may obtain the real-time charging amount of the vehicle by using the CAN data of the BMS.

According to an embodiment, the processor may receive a CAN signal from the BMS through at least one communication module in real time and may obtain the charging amount of the vehicle based on the CAN signal received.

According to an embodiment, in S650, the processor may determine whether the charging amount per minute of the vehicle is less than a reference value for a specified time.

According to an embodiment, the processor may measure (or acquire) the real-time charging amount of the vehicle in units of 1 minute for a specified time (e.g., 5 minutes), and compare the real-time charging amount of the vehicle with the reference value 580.

According to an embodiment, when it is determined that the charging amount per minute of the vehicle for a specified time is equal to or greater than the reference value (No in S650), the processor may return to operation S640 and continue to utilize the CAN data of the BMS to obtain the real-time charging amount of the vehicle.

According to an embodiment, when it is determined that the charging amount per minute of the vehicle is less than the reference value for a specified time (Yes in S650), in S660, the processor may determine whether the number of times when the charging amount per minute of the vehicle is less than the reference value is equal to or greater than a specified number of times. The processor may also determine that the contact points are mismatched between the wireless transmission and reception pads when the number of times when the charging amount per minute of the vehicle is less than the reference value is equal to or greater than the specified number of times.

According to an embodiment, the processor may determine whether the charging amount per minute of the vehicle is less than the reference value for a specified time and count the determination result. For example, the processor may count the number of times when the charging amount per minute of the vehicle is less than the reference value during a specified period of time.

According to an embodiment, the processor may determine whether the number of times when the charging amount per minute of the vehicle is less than the reference value for a specified period of time is a specified number of times (e.g., three times) or more.

According to an embodiment, when the number of times when the charging amount per minute of the vehicle is less than the reference value for a specified period of time is a specified number of times (e.g., three times) or more, the processor may determine that the contact points between the transmission and reception pads for wireless charging do not match.

For example, a case in which the contact points between the transmission and reception pads do not match may include a case in which the alignment state of the transmission and reception pads is out of a position alignment tolerance range, a case in which the transmission and reception pads are not aligned parallel to each other, and the like.

According to an embodiment, in S670, the processor may record and transmit information on the abnormal charging situation to the charger and inform the user of the abnormal charging state and the vehicle movement situation.

According to an embodiment, when it is determined that the contact points between the transmission and reception pads do not match, the processor may determine that the charging state of the vehicle is abnormal.

According to an embodiment, the processor may record information about the abnormal charging situation based on an in-vehicle fault code.

According to an embodiment, when it is determined that the charging state of the vehicle is abnormal, the processor may transmit a charging pause request command to the charger.

According to an embodiment, when it is determined that the charging state of the vehicle is abnormal, the processor may transmit the charging state information to the user terminal or AVN device through at least one communication module.

According to an embodiment, when it is determined that the charging state of the vehicle is abnormal, the processor may transmit a vehicle control command for correcting the location of the vehicle to the autonomous parking management controller through the communication module.

According to an embodiment, the processor may transmit information on the vehicle movement situation to the user terminal or AVN device through at least one communication module.

According to an embodiment, in S680, the processor may collect charging information of the vehicle again after the vehicle moves.

According to an embodiment, after the vehicle moves (or after the vehicle location is corrected), the processor may obtain the vehicle charging information again.

According to an embodiment, when it is determined that the charging state of the vehicle is abnormal based on the charging information obtained after the vehicle moves, the processor may replace the charger or move the vehicle.

According to an embodiment, when it is determined that the charging state of the vehicle is abnormal after the location of the vehicle is corrected, the processor may transmit data for identifying whether to replace the charger to the user terminal or AVN device.

According to an embodiment, the processor may transmit a control command for moving the vehicle to another charging parking space to the autonomous parking management controller in response to a charger replacement approval input through the user terminal device or AVN device.

According to an embodiment, the processor may transmit information on the charging fee payment and exit information to the user mobile phone or the user key when charging of the vehicle is completed after the location of the vehicle is corrected in response to the control command of the vehicle.

Figure 7:
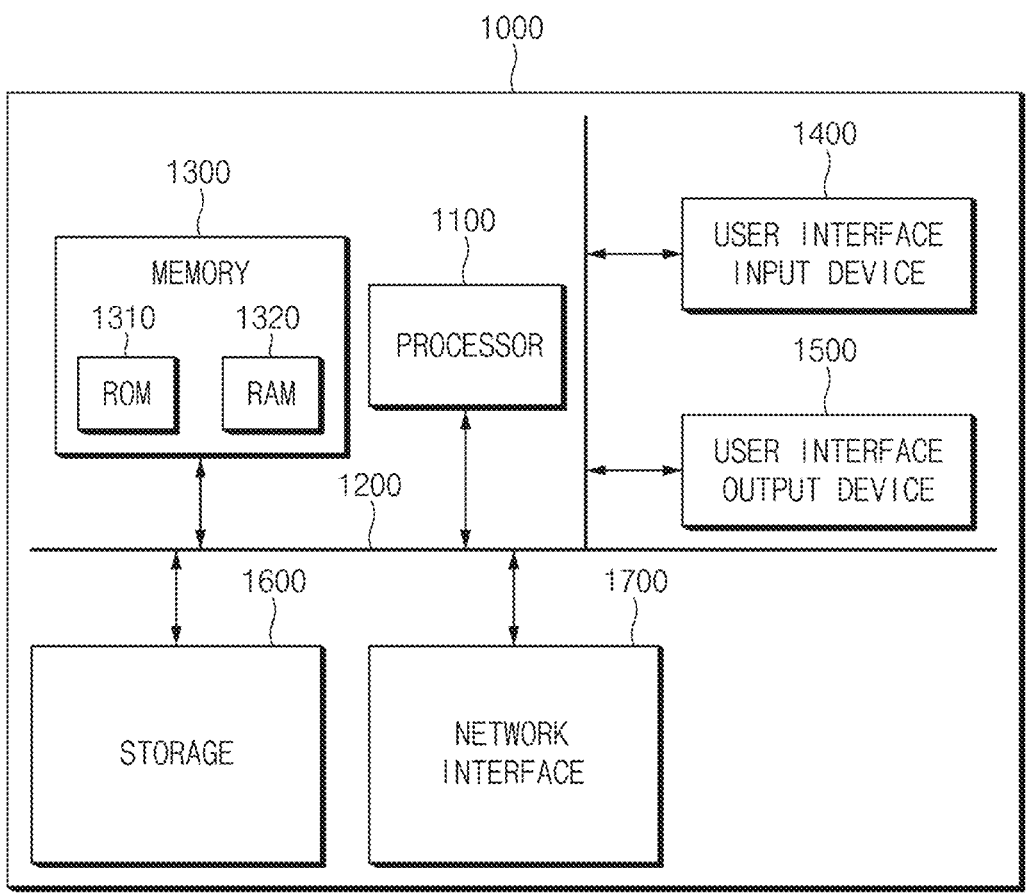
FIG. 7 is a block diagram illustrating a computing system for a vehicle charging control device and a method thereof according to an embodiment of the present disclosure.

FIG. 7 is a block diagram illustrating a computing system for a vehicle charging control device and a method thereof according to an embodiment of the present disclosure.

Referring to FIG. 7, a computing system 1000 for a vehicle charging control device and a method thereof may include at least one processor 1100, a memory 1300, a user interface input device 1400, a user interface output device 1500, storage 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, the processes of the method or algorithm described in relation to the embodiments of the present disclosure may be implemented directly by hardware executed by the processor 1100, a software module, or a combination thereof. The software module may reside in a storage medium (i.e., the memory 1300 and/or the storage 1600), such as a RAM, a flash memory, a ROM, an EPROM, an EEPROM, a register, a hard disk, solid state drive (SSD), a detachable disk, or a CD-ROM.

The storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another example, the processor and the storage medium may reside in the user terminal as an individual component.

The effect of the vehicle charging control device and the method thereof according to the present disclosure is described as follows.

According to at least one of the embodiments of the present disclosure, by adding logic for monitoring the existing CAN signal for vehicle battery charging information, it is possible to provide a location correction function between the transmission and reception pads without a separate cost increase.

In addition, according to at least one of the embodiments of the present disclosure, it is possible to quickly prevent a charging error by monitoring the real-time charging amount of the vehicle and correcting the position between the transmission and reception pads.

In addition, according to at least one of the embodiments of the present disclosure, charging efficiency may be increased by monitoring the real-time charging amount of the vehicle and correcting the position between the transmission and reception pads.

In addition, various effects that are directly or indirectly understood through the present disclosure may be provided.

Although embodiments of the present disclosure have been described for illustrative purposes, those ordinarily skilled in the art should appreciate that various modifications, additions and substitutions are possible, without departing from the scope and spirit of the disclosure.

Therefore, the embodiments disclosed in the present disclosure are provided for the sake of descriptions, not limiting the technical concepts of the present disclosure, and it should be understood that such embodiments are not intended to limit the scope of the technical concepts of the present disclosure. The protection scope of the present disclosure should be understood by the claims below, and all the technical concepts within the equivalent scopes should be interpreted within the scope of the right of the present disclosure.

What is claimed is:

1. A vehicle charging control device comprising:
at least one communication module; and
at least one processor electrically connected to the at least one communication module,
wherein the at least one processor is configured to:
obtain charging information of a vehicle from a battery management system (BMS) provided in the vehicle through the at least one communication module;
determine a charging state of the vehicle based on comparing the charging information of the vehicle with reference data, wherein the reference data includes a reference charging efficiency determined based on at least one of a vehicle type, a battery capacity for each vehicle type, a vehicle charging scheme, a BMS charging setting parameter, ambient temperature information, or weather information; and
transmit, through the at least one communication module, a vehicle control command for correcting a location of the vehicle to an autonomous parking management controller when it is determined that the charging state of the vehicle is abnormal.

2. The vehicle charging control device of claim 1, wherein the control command of the vehicle includes a control command corresponding to at least one of a forward control, a reverse control, a steering control, or a stop control.

3. The vehicle charging control device of claim 1, wherein the at least one processor is configured to:
receive a signal from the BMS in real time through the at least one communication module; and
obtain the charging information of the vehicle based on the received signal.

4. The vehicle charging control device of claim 1, wherein the charging information includes a least one of a charging speed, a charging amount, or a charging efficiency of the vehicle.

5. The vehicle charging control device of claim 1, wherein the at least one processor is configured to determine the charging state is abnormal, as a comparison result, a charging amount of the vehicle for a specified time is less than a reference value.

6. The vehicle charging control device of claim 1, wherein the at least one processor is configured to transmit charging state information to a user terminal or an audio, video, navigation (AVN) device provided in the vehicle through the at least one communication module when a number of times that it is determined that the charging state of the vehicle is abnormal is greater than or equal to a specified number of times.

7. The vehicle charging device of claim 1, further comprising:
a memory,
wherein the at least one processor is configured to:
store information on an abnormal charging state in the memory when the number of items that it is determined that the charging state of the vehicle is abnormal is greater than or equal to a specified number of times; and
transmit, through the at least one communication module, a charge pause request command to a charger.

8. The vehicle charging control device of claim 1, wherein the at least one processor is configured to:
transmit, through the at least one communication module, data for confirming whether to replace a charger to a user terminal or an audio, video, navigation (AVN) device provided in the vehicle when it is determined that the charging state of the vehicle is abnormal after the location of the vehicle is corrected in response to the control command of the vehicle.

9. The vehicle charging control device of claim 8, wherein the processor is configured to:
transmit, through the at least one communication module, a control command for moving the vehicle to another charging parking space to the autonomous parking management controller in response to a charger replacement approval input through the user terminal or the AVN device provided in the vehicle.

10. The vehicle charging control device of claim 1, wherein the at least one processor is configured to:
transmit, through the at least one communication module, information on payment of a charging fee and information on exiting of the vehicle to a user mobile phone or a user key when charging of the vehicle is completed after the location of the vehicle is corrected in response to the control command of the vehicle.

11. A method of controlling charging of a vehicle, the method comprising:
obtaining, by at least one processor, charging information of a vehicle from a battery management system (BMS) provided in the vehicle through the at least one communication module;
determining, by at least one processor, a charging state of the vehicle based on comparing the charging information of the vehicle with reference data, wherein the reference data includes a reference charging efficiency determined based on at least one of a vehicle type, a battery capacity for each vehicle type, a vehicle charging scheme, a BMS charging setting parameter, ambient temperature information, or weather information; and
transmitting, by the at least one processor, a vehicle control command for correcting a location of the vehicle to an autonomous parking management controller through the at least one communication module when it is determined that the charging state of the vehicle is abnormal.

12. The method of claim 11, wherein the control command of the vehicle includes a control command corresponding to at least one of a forward control, a reverse control, a steering control, or a stop control.

13. The method of claim 11, wherein the obtaining of the charging information of the vehicle includes:

receiving, by the at least one processor, a network signal from the BMS in real time through the at least one communication module; and obtaining, by the at least one processor, the charging information of the vehicle based on the received network signal.

14. The method of claim 11, wherein the charging information includes at least one of a charging speed, a charging amount, or a charging efficiency of the vehicle.

15. The method of claim 11, further comprising:

determining, by the at least one processor, that the charging state is abnormal when, as a comparison result, a charging amount of the vehicle for a specified time is less than a reference value.

16. The method of claim 11, further comprising:

transmitting, by the at least one processor, charging state information to a user terminal or an audio, video, navigation (AVN) device provided in the vehicle through the at least one communication module when a number of times that it is determined that the charging state of the vehicle is abnormal is greater than or equal to a specified number of times.

17. The method of claim 11, further comprising:

storing, by the at least one processor, information on an abnormal charging state in the memory when the number of times that it is determined that the charging state of the vehicle is abnormal is greater than or equal to a specified number of times; and transmitting, by the at least one processor, a charge pause request command to a charger through the at least one communication module.

18. The method of claim 11, further comprising:

transmitting, by the at least one processor, data for confirming whether to replace a charger to a user terminal or an audio, video, navigation (AVN) device provided in the vehicle through the at least one communication module when it is determined that the charging state of the vehicle is abnormal after the location of the vehicle is corrected in response to the control command of the vehicle.

19. The method of claim 18, further comprising:

transmitting, by the at least one processor, a control command for moving the vehicle to another charging parking space to the autonomous parking management controller through the at least one communication module in response to a charger replacement approval input through the user terminal or the AVN device provided in the vehicle.

20. The method of claim 11, further comprising:

transmitting, by the at least one processor, information on payment of a charging fee and information on exiting of the vehicle to a user mobile phone or a user key through the at least one communication module when charging of the vehicle is completed after the location of the vehicle is corrected in response to the control command of the vehicle.

* * * * *